UNITED STATES PATENT OFFICE.

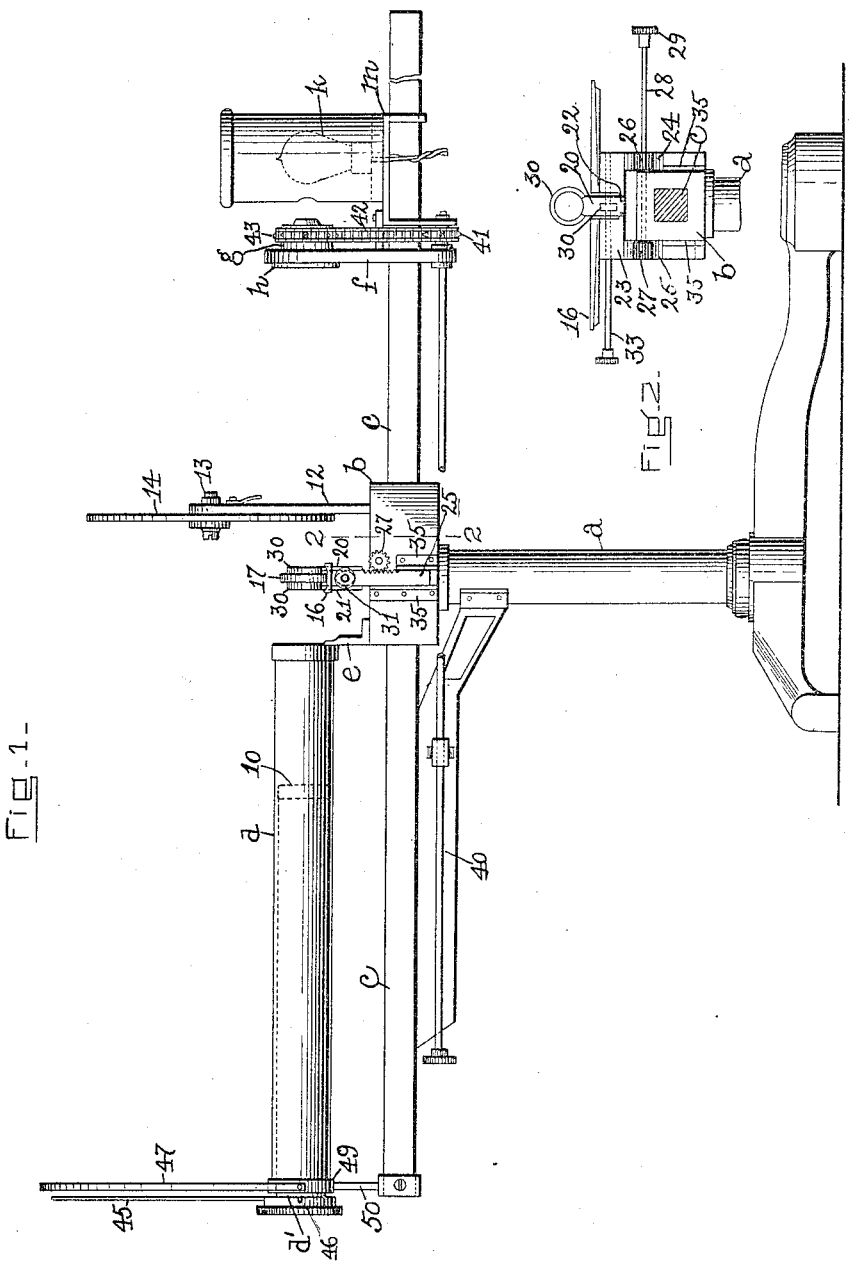

JOHN W. COLLINSON, OF GREENWOOD, MASSACHUSETTS, ASSIGNOR TO ANDREW J. LLOYD COMPANY, OF BOSTON, MASSACHUSETTS, A CORPORATION OF MASSACHUSETTS.

INSTRUMENT FOR TESTING LENSES.

1,210,606.   Specification of Letters Patent.   Patented Jan. 2, 1917.

Application filed June 16, 1913. Serial No. 773,812.

*To all whom it may concern:*

Be it known that I, JOHN W. COLLINSON, a subject of the King of Great Britain, but now residing in Greenwood, county of Middlesex, and State of Massachusetts, have invented an Improvement in Instruments for Testing Lenses, of which the following description, in connection with the accompanying drawings, is a specification, like letters on the drawings representing like parts.

This invention relates to an instrument for testing lenses of the class shown and described in U. S. Patent No. 585,390 dated June 29, 1897, in which the lens to be tested is supported by a holder or rest, which is interposed between the focusing lens and the screen.

The present invention has for one of its objects to provide instruments of the character described, with a lens holder or rest, which is capable of being quickly and easily adjusted vertically so as to enable the center of the lens being tested, to be brought substantially in an instant into the axis or line passing through the center of the screen and the focusing lens, whereby lenses of different sizes may be accurately tested with the same instrument.

The particular features of this invention will be pointed out in the claim at the end of this specification.

Figure 1 is a side elevation of an instrument embodying this invention, and Fig. 2, a cross-section on the line 2—2, Fig. 1.

Referring to the drawing, $a$ represents a standard or upright provided with a head $b$ through which is extended a bar $c$, which supports one end of a tube $d$ having its other end supported by a bracket $e$ on the head $b$. The tube $d$ may be provided with a telescoping member $d'$, which is rotatable in the tube $d$. The bar $c$ also supports an upright $f$ in which is mounted a revoluble carrier $g$ for an opaque disk $h$, through which are passed rays of light from a lamp $k$, which is mounted on a base $m$ supported by and arranged to slide on the bar $c$. The tube $d$ contains a screen 10 and the head $b$ supports an upright 12 carrying a pivot 13 for a revoluble lens carrier 14, which is provided with a plurality of focusing lenses of different focal lengths (not shown). The lens carrier 14 is arranged so that the center of one of the lenses carried by it, is in the same line or axis as the center of the screen 10.

Between the tube $d$ and the lens carrier 14 is a rest 16 for the lens 17 to be tested, said rest having coöperating with it two spring arms 20, which constitute a holder for the lens 17 and are secured at their lower ends by screws 22 or otherwise to the cross bar 23 of a yoke-shaped frame provided with vertical members or rack bars 24, 25, which are located on opposite sides of the head $b$, so that the yoke-shaped frame straddles the said head (see Fig. 2). The rack bars 24, 25, are engaged with pinions 26, 27, fast on a shaft 28 extended through the head $b$ and provided with a thumb wheel 29. The spring arms 20 are provided with rings 30 for engaging the lens 17 to be tested, which rests on the support 16 with its horizontal axis parallel therewith, and said arms are separated to permit the lens 17 to be inserted between them, by a cam 31 on a shaft 33 carried by the cross bar 23.

The rack bars 24, 25, are movable in guides 35 secured to the opposite sides of the head $b$. By reference to Fig. 1, it will be seen that the lens 17 inserted between the rings 30 and resting on the cross bar or rest 16 attached to the cross bar 23, is capable of being quickly and easily raised and lowered by merely turning the shaft 28, which is extended laterally from the head $b$ and is accessible to the operator from the front end of the instrument, who will usually be seated and have his eye applied to the front end of the tube $d'$. When the operator rotates the shaft 28, the pinions 26, 27, thereon are rotated and effect movement of the rack bars 24, 25, with the result that the center of the lens 17 being tested, can be brought into the center line or axis passing through the center of the screen 10 and the focusing lens coöperating therewith. In this manner, lenses of different sizes, that is, with greater or less vertical diameters, may be accurately tested, inasmuch as each lens being tested may be raised or lowered so that the image received upon the screen will appear at the center of the latter.

The opaque disk $h$ may be rotated from the front of the instrument by the operator turning a shaft 40, which is provided at its rear end with a small sprocket wheel 41 connected by a link chain 42 with a large sprocket wheel 43 fast to the carrier g for the opaque disk. The shaft 40 is also employed to move the upright f, which supports the carrier for the opaque disk and also the base m, which supports the lamp, on the supporting bar c to focus the rays of light passing through the opaque disk upon the screen. The upright f and base m straddle the bar c and are connected together to slide on said bar as one piece.

Provision is made for obtaining a more accurate reading of the axis of the lens being tested, either the horizontal or vertical or both, and for this purpose the tube $d'$, which is rotated by the operator to bring the hair line on the screen into coincidence with the line of light on the screen 10, has fast on it two pointers 45, 46, extended at right angles to each other and corresponding to the vertical and horizontal axes of the lens. The pointers revolve with the tube $d'$ and coöperate with a semi-circular scale 47, which is stationary and concentric with the stationary tube $d$, to which it is secured by the radial arms 48 and the collar 49, which is secured to an upright 50 fastened to the stationary bar c. When the tube $d'$ is turned to bring the hair line on the screen into coincidence with the line of light thereon, the pointers are turned with the tube $d'$ to indicate on the scale 47 either the vertical or horizontal axis of the lens being tested, and by reason of the fact that the scale is disconnected from the tube $d'$, it can be made of sufficiently large size so as to obtain graduations which are substantially widely separated, and the pointers are made substantially long, so that a slight movement of the tube $d'$ is multiplied at the ends of the pointers, and in this manner a more accurate reading of the axis of the lens can be obtained on the scale.

Claim.

In an apparatus of the character described, in combination, a standard, a head supported thereby, a yoke-shaped frame straddling said head and provided on opposite sides thereof with rack bars, a shaft extended through said head and laterally therefrom and provided on opposite sides thereof with pinions in mesh with said rack bars, means for guiding said rack bars, and a holder for the lens to be tested supported by said frame.

In testimony whereof, I have signed my name to this specification in the presence of two subscribing witnesses.

JOHN W. COLLINSON.

Witnesses:
D. CURRIE DOLEMAN,
WILLIAM F. HERRON.

Copies of this patent may be obtained for five cents each, by addressing the "Commissioner of Patents Washington, D. C."